United States Patent

Minamimoto et al.

(10) Patent No.: US 9,450,761 B2
(45) Date of Patent: Sep. 20, 2016

(54) MEMORY SYSTEM AND METHOD OF GENERATING MANAGEMENT INFORMATION

(71) Applicant: Kabushiki Kaisha Toshiba, Minato-ku (JP)

(72) Inventors: Takeyuki Minamimoto, Urayasu (JP); Kentaro Umesawa, Kawasaki (JP); Masaki Saito, Yokohama (JP); Masamitsu Ohhashi, Yokohama (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 17 days.

(21) Appl. No.: 14/454,950

(22) Filed: Aug. 8, 2014

(65) Prior Publication Data

US 2015/0256344 A1    Sep. 10, 2015

Related U.S. Application Data (60) Provisional application No. 61/948,852, filed on Mar. 6, 2014.

(51) Int. Cl.
*H04L 29/00* (2006.01)
*H04L 9/32* (2006.01)
*G06F 21/44* (2013.01)
*G06F 21/79* (2013.01)

(52) U.S. Cl.
CPC ........... *H04L 9/3247* (2013.01); *H04L 9/3242* (2013.01); *G06F 21/44* (2013.01); *G06F 21/79* (2013.01)

(58) Field of Classification Search
CPC ... H04L 9/3242; H04L 9/3247; G06F 21/44; G06F 21/79; G06F 2221/2129; G11B 20/00137; G11B 20/00086; G11B 20/00666; G11B 20/00673; G11B 20/0021
See application file for complete search history.

(56) References Cited

U.S. PATENT DOCUMENTS

| | | | |
|---|---|---|---|
| 2006/0206945 A1* | 9/2006 | Kato et al. | 726/27 |
| 2008/0037776 A1* | 2/2008 | Akiyama et al. | 380/44 |
| 2011/0078459 A1* | 3/2011 | Yoshioka et al. | 713/189 |
| 2012/0017093 A1* | 1/2012 | Savitzky et al. | 713/178 |
| 2012/0260349 A1* | 10/2012 | Nagai et al. | 726/28 |

FOREIGN PATENT DOCUMENTS

| | | |
|---|---|---|
| JP | 2003-76611 | 3/2003 |
| JP | 2008-191851 | 8/2008 |
| JP | 2008-206158 | 9/2008 |
| JP | 2012-64228 | 3/2012 |
| JP | 2012-221246 | 11/2012 |

* cited by examiner

*Primary Examiner* — Don Zhao
(74) *Attorney, Agent, or Firm* — Oblon, McClelland, Maier & Neustadt, L.L.P (57) ABSTRACT

According to one embodiment, a memory system includes a host interface, a first storage unit which stores data in a nonvolatile manner, and a memory controller. The memory controller includes a management information generating unit which generates command information for every command received from a host through the host interface and a digital signature calculating unit which generates a digital signature from the command information using a secret key. The management information generating unit generates management information which contains the command information and the digital signature for the every command.

18 Claims, 9 Drawing Sheets

| NAME | | DETAILS |
|---|---|---|
| COMMAND INFORMATION | COMMAND CODE (Cmd) | MANAGEMENT COMMAND CAUSING OUTPUT OF MANAGEMENT INFORMATION |
| | MODEL NAME (Model) | DEVICE NAME |
| | SERIAL NUMBER (S/N) | INDIVIDUAL DEVICE NUMBER |
| | DATE (Date) | IT IS SET AS PARAMETER OF COMMAND FROM HOST. IT MAY BE CALCULATED BASED ON DATA RECEIVED FROM HOST AT STARTING UP AND INFORMATION ON ENERGIZATION TIME MANAGED IN STORAGE |
| | MEMO (Memo) | DATA SET FROM HOST FOR MANAGEMENT |
| | COMMAND IDENTIFYING INFORMATION (SEQUENCE NUMBER (SeqNum)) | PROCESS NUMBER OF MANAGEMENT COMMAND (STORED IN NONVOLATILE MANNER) |
| DIGITAL SIGNATURE (Sig) | | DIGITAL SIGNATURE |

| | NAME | DETAILS |
|---|---|---|
| COMMAND INFORMATION | COMMAND CODE (Cmd) | MANAGEMENT COMMAND CAUSING OUTPUT OF MANAGEMENT INFORMATION |
| | MODEL NAME (Model) | DEVICE NAME |
| | SERIAL NUMBER (S/N) | INDIVIDUAL DEVICE NUMBER |
| | DATE (Date) | IT IS SET AS PARAMETER OF COMMAND FROM HOST. IT MAY BE CALCULATED BASED ON DATA RECEIVED FROM HOST AT STARTING UP AND INFORMATION ON ENERGIZATION TIME MANAGED IN STORAGE |
| | MEMO (Memo) | DATA SET FROM HOST FOR MANAGEMENT |
| | COMMAND IDENTIFYING INFORMATION (SEQUENCE NUMBER (SeqNum)) | PROCESS NUMBER OF MANAGEMENT COMMAND (STORED IN NONVOLATILE MANNER) |
| | HASH CHAIN (LINK) | HASH VALUE CALCULATED FOR OPERATION LOG AT THE LAST TIME |
| DIGITAL SIGNATURE (Sig) | | DIGITAL SIGNATURE |

MEMORY SYSTEM AND METHOD OF GENERATING MANAGEMENT INFORMATION

CROSS-REFERENCE TO RELATED APPLICATIONS

This application is based upon and claims the benefit of priority from U.S. Provisional Application No. 61/948,852, filed on Mar. 6, 2014; the entire contents of which are incorporated herein by reference.

FIELD

Embodiments described herein relate generally to a memory system and a method of manufacturing management information.

BACKGROUND

In recent years, as a cloud service comes into wide use, data amount of companies or individuals which are accumulated in a data center is rapidly increased. Since the data collected in a cloud is not under the management of a user, some users may concern about that the data is illegally used. For this reason, from the viewpoint of data security, there is a requested method which can obviously show the user data operation/management state such as erase of data accumulated in a storage device used in the cloud service.

DETAILED DESCRIPTION

In general, according to one embodiment, a memory system includes a host interface which is connectable to a host, a first storage unit which stores data in a nonvolatile manner, and a memory controller. The memory controller includes a management information generating unit which generates command information for every command received through the host interface and a digital signature calculating unit which generates a digital signature from the command information using a secret key. The management information generating unit generates management information which contains the command information and the digital signature for the every command.

A memory system and a management information generating method according to embodiments will be described in detail with reference to the accompanying drawings. In addition, the invention is not limited to these embodiments.

(First Embodiment)

Figure 1:
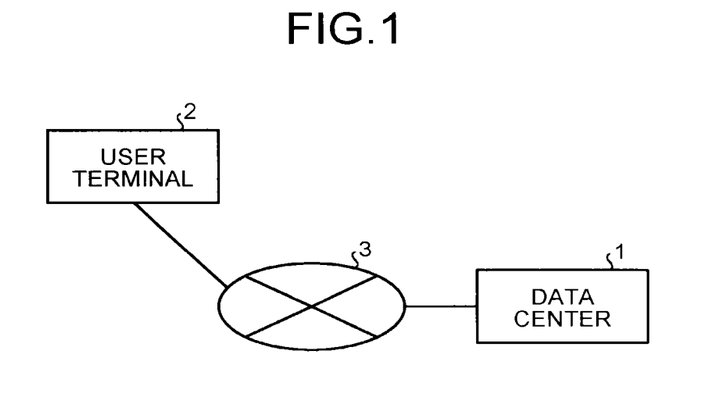
FIG. 1 is a diagram schematically illustrating an exemplary configuration of a network to which a memory system according to a first embodiment is applied.

FIG. 1 is a diagram schematically illustrating an exemplary configuration of a network to which a memory system according to a first embodiment is applied. As illustrated in FIG. 1, a data center 1 to which the memory system according to the first embodiment is applied is connected to a user terminal 2 through a network 3 such as the Internet. The user terminal 2 is a terminal carried by an end user, and gives an instruction to write data in the data center 1 or to read out data from the data center 1 through the network 3. The user terminal 2 is an information processing terminal such as a personal computer, a tablet terminal, and a smart phone. The data center 1 writes or reads the data based on the instruction from the user terminal 2. Further, in the first embodiment, the data center 1 performs processes even on management commands related to the operations of the data center 1 as described below.

Figure 2:
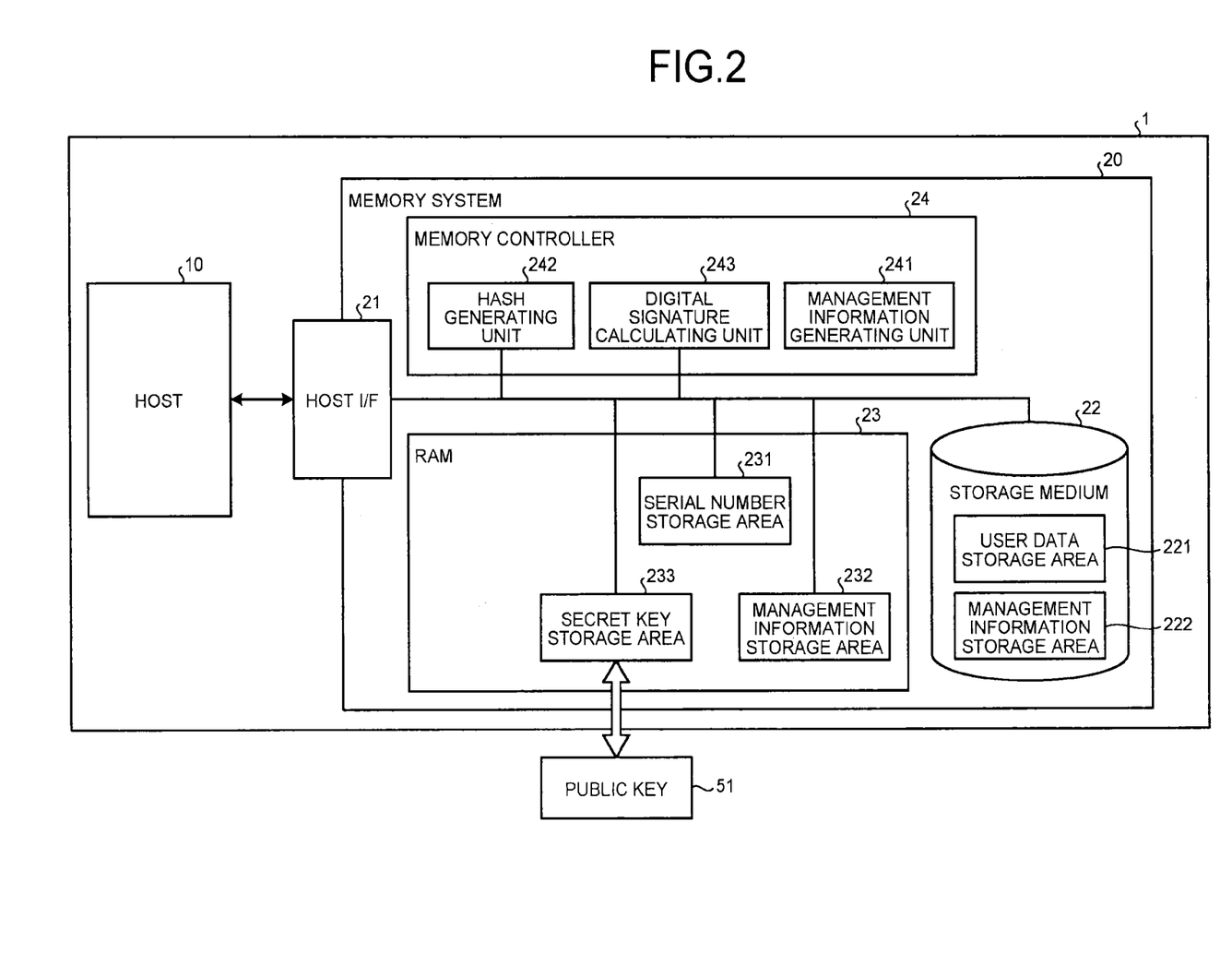
FIG. 2 is a block diagram schematically illustrating an exemplary configuration of a data center of FIG. 1.

FIG. 2 is a block diagram schematically illustrating an exemplary configuration of a data center of FIG. 1. The data center 1 includes a host 10 and a memory system 20. The memory system 20, for example, is a Solid State Drive (SSD) or a Hard Disk Drive (HDD). The memory system 20, for example, functions as an external storage device of the host 10. When receiving an instruction from the user terminal 2, the host 10 issues a command for accessing the memory system 20 based on the instruction, and receives a response on the command from the memory system 20. As an access to the memory system 20, data write or read can be exemplified. Further, in the first embodiment, performing initialization, erase, reuse, and discard on a storage medium 22 of the memory system 20 is defined as a storage management policy. In order to make the operation realized according to the management policy, the memory system 20, for example, has a function of receiving a management command for instructing initialization, erase, reuse, and discard, and performing a process corresponding to the received command. The initialization is a process of initializing the memory system 20. The erase is a process of erasing data written in the memory system 20, and making the memory system 20 enter a discard waiting state. The reuse is a process of using the memory system 20 in the erase state again. The discard is a process of disabling the memory system 20 in the erase state from being physically discarded.

The memory system 20 includes a host interface 21, the storage medium 22, a Random Access Memory (RAM) 23, and a memory controller 24. In addition, FIG. 2 illustrates only the configurations necessary for generating management information which makes the end user or the reliable third party confirm whether the data operation/management is rightly performed while other configurations for realizing functions related to data write/read, for example, are not illustrated. In addition, as the reliable third party described herein, an operation supervisory agency including a certificate authority can be exemplified.

The host interface 21, for example, is connected to the host 10 which is a communication interface in conformity with a Serial Advanced Technology Attachment (SATA) standard, and performs interfacing in conformity with the SATA standard. Besides the SATA, a Serial Attached Small computer system interface (SAS) or the like may be applied for the interfacing.

The storage medium 22 stores user data transmitted from the host 10, management information of the memory system 20, and the like. Besides the information necessary for making the memory system 20 operate, the management information of the memory system 20 includes management information which is used for verifying whether the data operation/management is rightly performed in the memory system 20. Therefore, the storage medium 22 is provided with a user data storage area 221 which stores the user data and a management information storage area 222 which stores the management information. As the storage medium 22, a NAND flash memory, a magnetic disk, and other nonvolatile storage media can be used.

The RAM 23 stores the operation/management information related to the memory system 20. In the first embodiment, the RAM 23 includes a serial number storage area 231, a management information storage area 232, and a secret key storage area 233. Examples of the RAM 23 include a Static Random Access Memory (SRAM), a Dynamic Random Access Memory (DRAM), a nonvolatile Magnetic Random Access Memory (MRAM), or a Ferroelectric Random Access Memory (FeRAM). Further, the information stored in the RAM 23 may be stored in a security area in the storage medium 22 instead of the RAM 23.

The serial number storage area 231 stores a serial number as the operation/management information. The serial number is a number which is uniquely assigned to the memory system 20 to identify a device. The serial number of the memory system 20 is stored in the storage medium 22; for example, the serial number is read out of the storage medium 22 to the serial number storage area 231 at the time of starting up the memory system 20.

Figure 3:
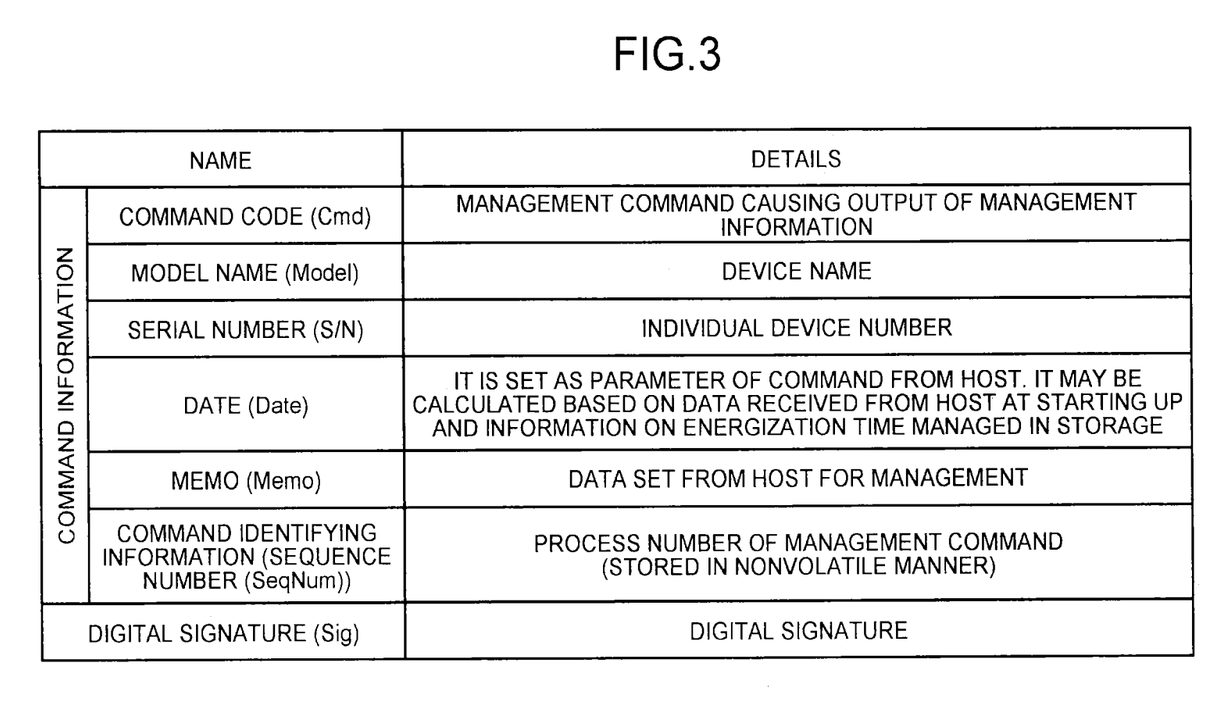
FIG. 3 is a diagram illustrating an exemplary format of an operation log.

The management information storage area 232 stores management information which is generated by a management information generating unit 241 (described below) of the memory controller 24 as the operation/management information. The management information is information which indicates whether the memory system 20 is rightly operated; an operation log in which a processing content is recorded when a management command is received from the host 10 can be exemplified. FIG. 3 is a diagram illustrating an exemplary format of an operation log. The operation log includes command information which indicates the content of the received management command regarding the system operation, and a digital signature (Sig) which is obtained by encrypting the command information using a secret key.

The command information includes a command code (Cmd), a model name (Model), a serial number (S/N), a date (Date), a memo (Memo), and command identifying information. The command code is a code which indicates a management command which causes the output of the operation log. As the management command causing the output of the operation log, there can be exemplified the respective commands of the initialization, erase, reuse, and discard described above. The model name is a device name of the memory system 20; a type name given by a manufacturer of the memory system 20 can be exemplified. The serial number is stored in the storage medium 22 in a nonvolatile manner and read out to the serial number storage area 231 of the RAM 23, and read out of the serial number storage area 231 at the time of creating the operation log.

The date indicates a date when the management command is processed, which may include a time. The date may be set at the host 10 as a parameter of the command therefrom, or may be calculated from data received from the host 10 at the time of starting up and information on energizing time period which is managed in the memory system 20. The memo is data which is set by the host 10 for management. The command identifying information is information identifying an issued management command, and a sequence number (SeqNum) can be exemplified which is sequentially assigned whenever the management command is issued. The sequence number is information which indicates an order of issuing the management command, that is, an operation issuing order, and is a parameter which makes the end user or the reliable third party confirm whether the management commands are performed in the order when the management information is verified. The command identifying information is stored in the storage medium 22 in a nonvolatile manner.

The digital signature is a value (information) which is obtained by calculating a hash value of the command information (information from the command code to the command identifying information) and then encrypting the hash value using the secret key. The generated operation log, for example, is stored in the storage medium 22 before the power of the memory system 20 goes out.

The secret key storage area 233 stores the secret key which is used when the digital signature is generated by a digital signature calculating unit 243 (described below) of the memory controller 24 as the operation/management information. For example, the secret key of the memory system 20 is stored in the storage medium 22, and read out of the storage medium 22 to the secret key storage area 233 at the time of starting up the memory system 20. In addition, a public key 51 which is paired with the secret key is made public from the manufacturer of the memory system 20.

The memory controller 24 includes the management information generating unit 241, a hash generating unit 242, and the digital signature calculating unit 243. In the first embodiment, the firmware of the memory system 20 has a function of adding information for assuring the content of the management information through a security function with respect to the management command defined according to the management policy.

When receiving the management command from the host 10, the management information generating unit 241 generates the management information and transmits the generated information to the host 10. In a case where the operation log is used as the management information, information necessary for the command information is collected by the management information generating unit 241 according to the format of the operation log, the digital signature generated by the digital signature calculating unit 243 is obtained, and then the operation log is generated.

The hash generating unit 242 generates a hash value of the command information generated by the management information generating unit 241, and transfers the generated hash value to the digital signature calculating unit 243.

The digital signature calculating unit 243 calculates a digital signature using the secret key stored in the secret key storage area 233 of the RAM 23 based on the hash value generated by the hash generating unit 242, and transfers the calculated digital signature to the management information generating unit 241.

Figure 4:
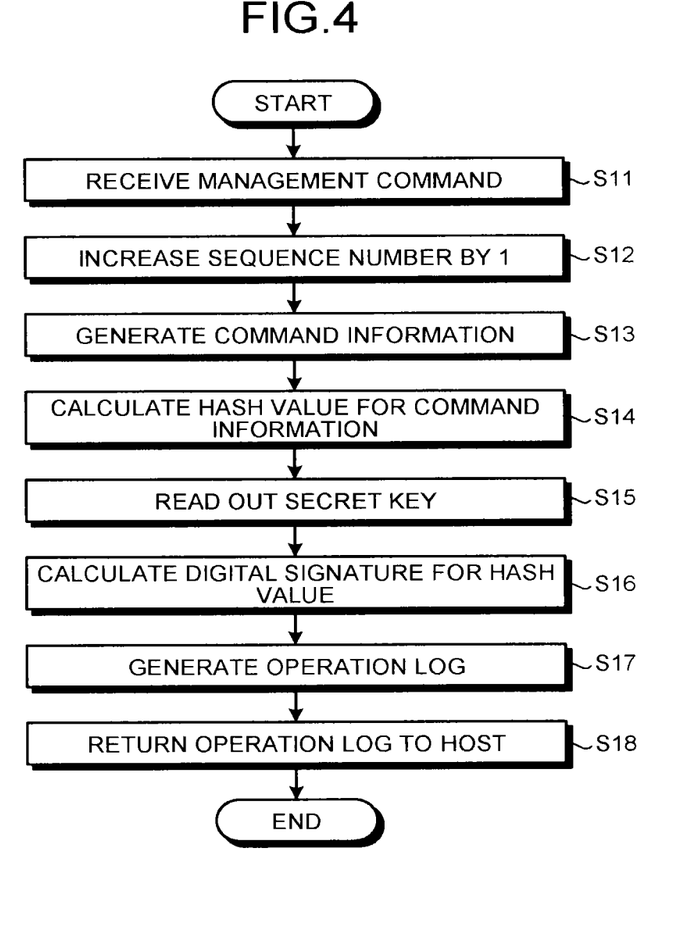
FIG. 4 is a flowchart illustrating an example of a processing sequence of a management information generating method according to the first embodiment.

Next, a management information generating method of the memory system 20 having such a configuration will be described. FIG. 4 is a flowchart illustrating an example of a processing sequence of a management information generating method according to the first embodiment. In addition, in the following, an example of using the operation log as the management information will be given for description.

First, when a management command is received from the host 10 (Step S11), the management information generating unit 241 increases the sequence number by 1 (Step S12), and generates the command information (Step S13). Specifically, the management command, date information of the command parameter, and memo information thus received are set as "Command code", "Date", and "Memo", respectively. Further, the model name of the memory system 20 is set as "Model name". Furthermore, a unique serial number of a device is read out of the RAM 23, and set as "Serial number". In addition, a sequence number increased by 1 in Step S12 is read out of the RAM 23, and set as "Sequence number".

Next, the hash generating unit 242 calculates a hash value for the command information generated in Step S13 (Step S14). Then, the digital signature calculating unit 243 reads a secret key out of the secret key storage area 233 of the RAM 23 (Step S15), and calculates a digital signature for the hash value generated in Step S14 using the secret key (Step S16). Next, the management information generating unit 241 sets the calculated digital signature as "Digital signature", and generates an operation log (Step S17).

Then, the operation log is returned to the host 10 (Step S18). The returning may be a reply to the management command, or may be a reply to a command which is separately prepared for acquisition of the operation log. Finally, the management information generating method is ended. In addition, the operation log is made public to the end user and the reliable certificate authority by the host 10, and the end user or the reliable certificate authority can verify the content using the public key 51 which is paired with the secret key and made public by the manufacturer of the memory system 20.

Figure 5:
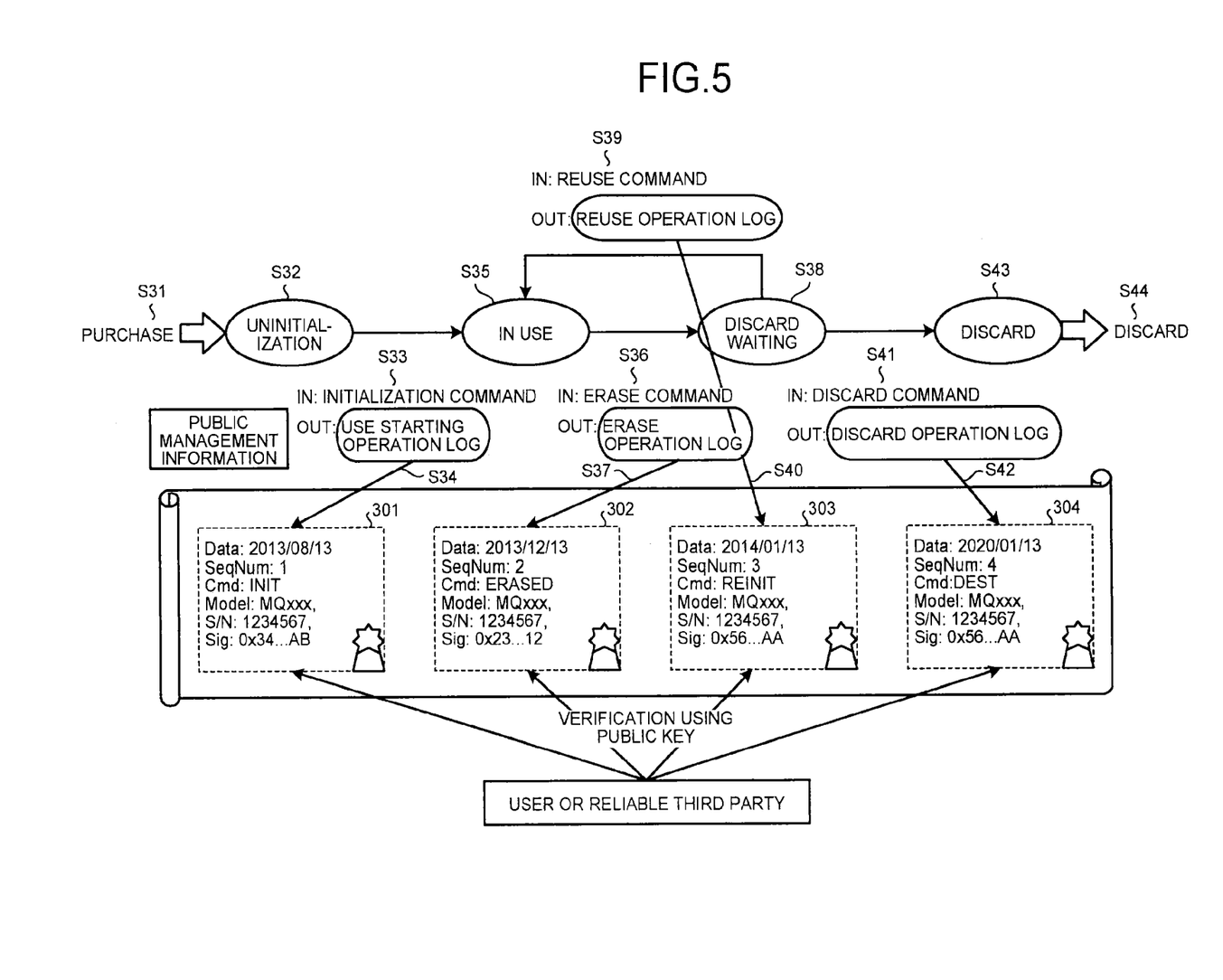
FIG. 5 is a conceptual diagram schematically illustrating the management of a memory system according to the first embodiment.

Herein, the management of the memory system 20 will be described according to the operation policy in the network system as illustrated in FIG. 1. FIG. 5 is a conceptual diagram schematically illustrating the management of a memory system according to the first embodiment. The data center 1, which provides a cloud service, defines the operation policy, and the memory system 20 has a function of securing the log which represents an operation managed according to the operation policy. The securing of data in the data center 1 is performed using the memory system 20 which has a function of securing the operation log (management information). The end user or the reliable third party verifies the erase or discard operation of data in the memory system 20 which is requested by the end user based on the operation log which is made public by the data center 1.

First, the end user, for example, purchases a data service through which data can be secured in a storage on a network (Step S31). In this state, the memory system 20 is in an uninitialized state (Step S32). Then, when the end user transmits a request for starting the data service from the data center 1, the host 10 first issues an "initialization" command (Step S33).

Since the initialization command is the management command, the memory system 20 generates an operation log 301. The operation log 301 includes command information which contains a date of "2013/08/13", a sequence number of "1", a command code of "initialization command (INIT)", a model name of "MQxxx", and a serial number of "1234567", and a digital signature of "0x34 . . . AB" which is obtained by hashing the command information and encrypting the hashed command information with a secret key. The operation log 301 containing such content is made public to the end user or the reliable third party as a use starting operation log (Step S34).

Accordingly, the initialization of the memory system 20 is performed, and the memory system 20 enters a usable state for the end user (Step S35). After using the memory system 20, in a case where the end user thinks that the memory system 20 is not needed, the end user requests data erase from the data center 1, the host 10 which received the request issues an "erase" command (Step S36).

Since the erase command is the management command, the memory system 20 generates an operation log 302. The operation log 302 includes command information which contains a date of "2013/12/13", a sequence number of "2", a command code of "erase command (ERASED)", a model name of "MQxxx", and a serial number of "1234567", and a digital signature of "0x23 . . . 12" which is obtained by hashing the command information and encrypting the hashed command information with a secret key. The operation log 302 containing such content is made public to the end user or the reliable third party as an erase operation log (Step S37).

Accordingly, the data erase of the memory system 20 is performed, and the memory system 20 enters a discard waiting state (Step S38). Then, in a case where the end user changes his/her mind to reuse the memory system 20 and makes a request for the reusing, the host 10 issues a "reuse" command (Step S39).

Since the reuse command is of the management command, the memory system 20 generates an operation log 303. The operation log 303 includes command information which contains a date of "2014/01/13", a sequence number of "3", a command code of "reuse command (REINIT)", a model name of "MQxxx", and a serial number of "1234567", and a digital signature of "0x56 . . . AA" which is obtained by hashing the command information and encrypting the hashed command information with a secret key. The operation log 303 containing such content is made public to the end user or the reliable third party as a reuse operation log (Step S40). Accordingly, the memory system 20 returns to the same use state as the initialization (Step S35).

On the other hand, in a case where the end user requests the discard from the memory system 20 in the discard waiting state, the host 10 issues a "discard" command (Step S41).

Since the disposal command is of the management command, the memory system 20 generates an operation log 304. The operation log 304 includes a date of "2014/01/13", a sequence number of "4", a command code of "disposal command (DEST)", a model name of "MQxxx", and a serial number of "1234567", and a digital signature of "0x56 . . . AA" which is obtained by hashing the command information and encrypting the hashed command information with a secret key. The operation log 304 containing such content is made public to the end user or the reliable third party as a discard operation log (Step S42). Then, the memory system 20 (the storage medium 22) is subjected to a logical process necessary for the physical discard (Step S43). Therefore, the memory system 20 enters a nonoperational state. Then, the memory system is physically discarded in practice (Step S44), and enters a state in which the storage medium 22 is not accessible any more.

The data center 1 acquires the operation logs 301 to 304 from the memory system 20 which indicate these operations/commands are issued for the above-mentioned respective management commands, and makes public the operation logs to the end user or the reliable third party. Therefore, the end user or the reliable third party can verify whether the operation is performed according to the request of the end user based on the operation logs 301 to 304 which are made public by the data center 1 using the public key 51 which is made public by the manufacturer of the memory system 20.

The end user or the reliable third party decrypts the digital signatures in the operation logs 301 to 304 using the public key 51. Further, the end user or the reliable third party generates a hash value of the command information in each of the operation logs 301 to 304, compares the hash value with the decrypted digital signature to verify whether the both are the same. In a case where the both are the same, it is verified that there is no falsification or forgery in the operation logs 301 to 304, the memory system 20 is normally operated according to the management policy, and thus the operation logs are reliable. In a case where the both are not the same, it indicates that there is some falsification or forgery in the operation logs 301 to 304, the memory system 20 is not normally operated according to the management policy, or the memory system 20 is used illegally by an ill-intentioned person.

As described above, in the first embodiment, the command information is generated for the command issued on the operation of the memory system 20, and the digital signature obtained by encrypting the hash value calculated for the command information using the secret key is added to the command information and made public. Therefore, the end user or the reliable third party can verify the operation log using the public key which is paired with the secret key made public by the manufacturer of the memory system 20. For example, in a case where an illegal process is performed on the command information, or the command information is falsified or forged, the hash value calculated from the command information in the falsified operation log becomes different from a value obtained by decrypting the digital signature, so that it is possible to detect the falsification or the forgery of the operation log. Therefore, for example, the manufacturer of the memory system 20 can establish an environment in which such illegal actions become difficult and the memory system 20 complying with the operation policy is easily managed. As a result, it is possible to prevent the falsification or forgery of the operation log, and the reliability to the operation of the data center 1 can be improved.

(Second Embodiment)

In the first embodiment, the description has been made on the assumption that the secret key used in the memory system is not stolen by a hacker. Therefore, in a case where the hacker acquires the secret key of the memory system, the operation log containing the content of a certain sequence number may be forged, but this forge is not possible to be detected in the first embodiment, so that the past operation logs are no longer reliable. Thus, in a second embodiment, a memory system and a management information generating method will be described, which makes it known to which degree the information is reliable in a case where the operation log is forged by the hacker who acquires the secret key.

Figure 6:
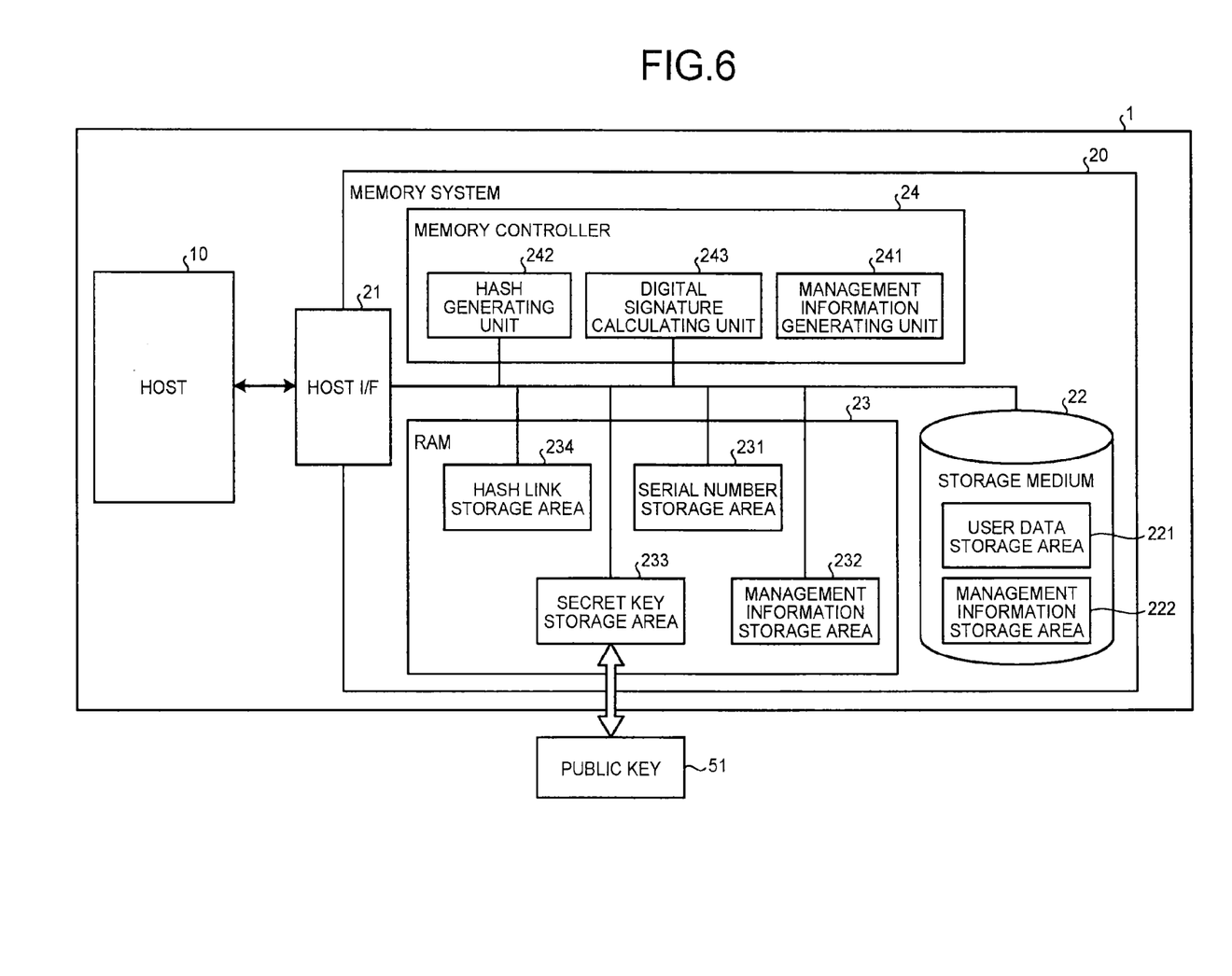
FIG. 6 is a block diagram schematically illustrating an exemplary configuration of a data center including a memory system according to a second embodiment.

FIG. 6 is a block diagram schematically illustrating an exemplary configuration of a data center including a memory system according to a second embodiment. In the second embodiment, the RAM 23 of a memory system 20 is provided with a hash link storage area 234 in which the hash value (hash chain) of the operation log generated by the hash generating unit 242 is stored. In addition, the content stored in the hash link storage area 234 is secured in the storage medium 22 before the power of the memory system 20 goes out.

Figure 7:
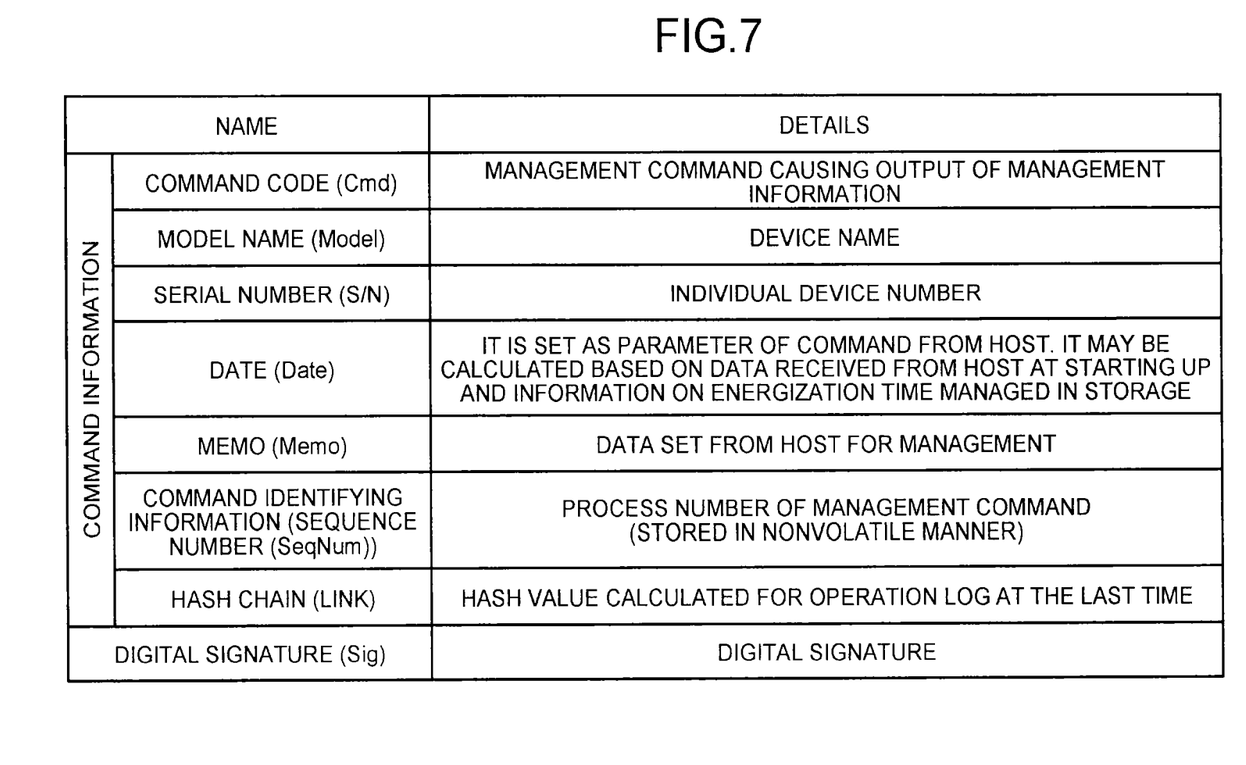
FIG. 7 is a diagram illustrating an exemplary format of an operation log according to the second embodiment.

Further, the operation log as the management information contains the hash chain (LINK). FIG. 7 is a diagram illustrating an exemplary format of an operation log according to the second embodiment. As illustrated in the drawing, the command information of the operation log contains the hash chain. The hash chain is a hash value calculated for the operation log which is generated with respect to the management command received at the last time.

Furthermore, the hash generating unit 242 has a function of calculating the hash chain with respect to the operation log which contains the command information and the digital signature and storing the value in the hash link storage area 234 of the RAM 23 besides the function of calculating a hash value of the command information which contains the hash chain at the time of generating the digital signature. In addition, the same components as those of the first embodiment will be denoted with the same reference numerals, and the descriptions will not be repeated.

Figure 8:
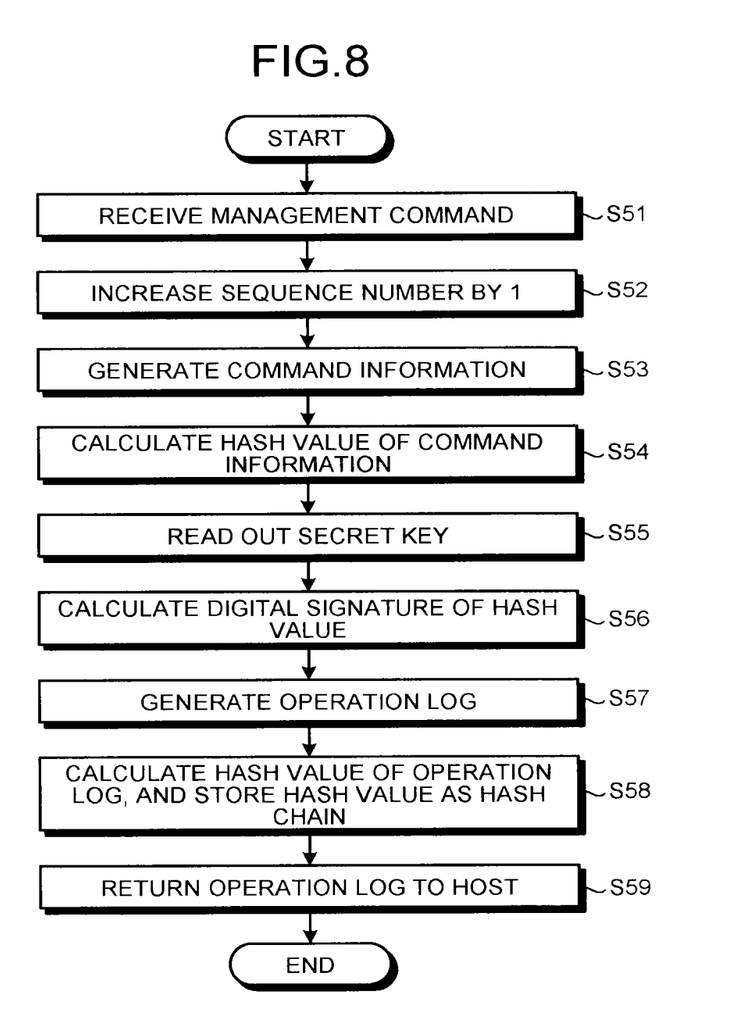
FIG. 8 is a flowchart illustrating an example of a processing sequence of a management information generating method according to the second embodiment.

Next, a management information generating method of the memory system 20 having such a configuration will be described. FIG. 8 is a flowchart illustrating an example of a processing sequence of a management information generating method according to the second embodiment. First, when the management command is received from the host 10 (Step S51), the management information generating unit 241 increases the sequence number by 1 (Step S52), and generates command information (Step S53). Specifically, the management command, date information of the command parameter, and memo information thus received are set as "Command code", "Date", and "Memo", respectively. Further, the model name of the memory system 20 is set as "Model name". Furthermore, a unique serial number of a device is read out of the RAM 23, and set as "Serial number". Further, the hash chain at the last time and the sequence number are read out of the RAM 23, and set as "hash chain" and "sequence number", respectively. In addition, the hash chain at the last time is a hash chain calculated with respect to the operation log corresponding to a command having a little sequence number by 1.

Next, the hash generating unit 242 calculates a hash value of the command information generated in Step S53 (Step S54). Then, the digital signature calculating unit 243 reads a secret key out of the secret key storage area 233 of the RAM 23 (Step S55), and calculates a digital signature of the hash value generated in Step S54 using the secret key (Step S56). Next, the management information generating unit 241 sets the calculated digital signature as "Digital signature", and generates an operation log (Step S57).

Thereafter, in the hash generating unit 242, the hash chain of the operation log generated in Step S57 is calculated and stored in the hash link storage area 234 of the RAM 23 as the hash chain (Step S58). Then, the operation log is returned to the host 10 (Step S59). The returning may be a reply to the management command, or may be a reply to a command which is separately prepared for acquisition of the operation log. Finally, the management information generating method is ended.

Figure 9:
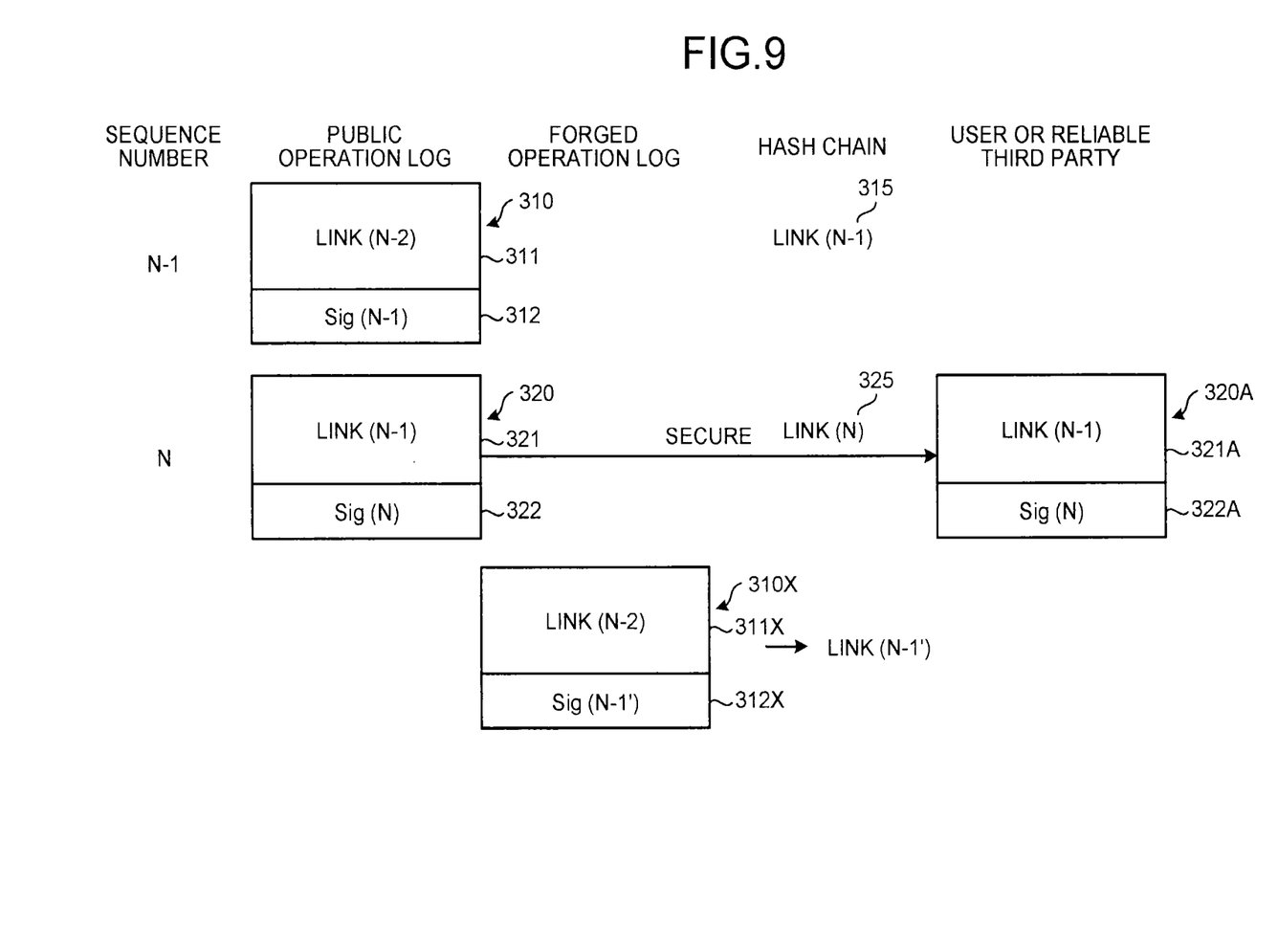
FIG. 9 is a diagram for describing a method of determining forgery.

Herein, the outline of a method of determining the presence of forgery according to the second embodiment will be described. FIG. 9 is a diagram for describing a method of determining forgery. FIG. 9 illustrates an operation log of the sequence number N−1, and the hash chain, and also illustrates the operation log when the sequence number is N, the hash chain, and the operation log which is secured by the end user or the reliable third party. In addition, the end user or the reliable third party is assumed to perform a process of periodically checking public management information which is made public by the manufacturer of the memory system 20 and locally securing the information. For example, herein, it is assumed that the operation log having the sequence number N is locally secured.

An operation log 310 of the sequence number N−1 includes command information 311 which contains the hash chain (LINK(N−2)) at the last time, and a digital signature 312 (Sig(N−1)) which is generated for the command information 311. Further, the hash chain 315 (LINK(N−1)) calculated for the operation log 310 is stored in the hash link storage area 234.

Further, the operation log 320 of the sequence number N includes command information 321 which contains the hash chain (LINK(N−1)) at the last time (the sequence number N−1), and a digital signature 322 (Sig(N)) which is generated for the command information 321. Further, the hash chain 325 (LINK(N)) calculated for the operation log 320 is stored in the hash link storage area 234. Then, an operation log 320A having the same content as that of the operation log 320 of the sequence number N is stored in the terminal of the end user (or the reliable third party).

Herein, it is assumed that a secret key of the memory system 20 is imperiled and the operation log 310 of the sequence number N−1 made public is forged. A forged operation log 310X includes command information 311X which contains the forged content and the hash chain (LINK(N−2)) at the last time, and a digital signature 312X (Sig(N−1')) which is generated for the command information 311X.

The end user or the reliable third party calculates a hash value LINK(N−1') of the forged operation log 310X, and compares the calculated hash value LINK(N−1') and the hash chain LINK(N−1) at the last time (the sequence number N−1) which is contained in the operation log 320A of the sequence number N secured by oneself. In a case where the forgery is not made, the both are matched with each other; however, since the operation log 310 of the sequence number N−1 is forged, the both become different. Specifically, the command information 311X is different from the command information 311 of the operation log 310 not forged, and a digital signature 312X for the command information 311X is also different from a digital signature 312 of the operation log 310 not forged. As a result, the value of the operation log 310X containing the command information 311X and the digital signature 312X is different from that of the operation log 310 containing the command information 311 and the digital signature 312, and also the hash values calculated from these values are different from each other. Therefore, it can be known that the operation log 310X of the sequence number N−1 is forged or falsified. Accordingly, the validity of the operation log stored before the sequence number N−1 can be verified.

As described above, in the second embodiment, the hash chain of the operation log is calculated, and then the hash chain is contained in the operation log generated when the management command is received. Since the hash chain is added to the operation log, even in a case where the secret key is leaked out, as long as the Nth log information has been verified, the accuracy of the 1st to Nth operation logs can be verified by verifying the operation logs in reverse order N−1, N−2, . . . , 2, and 1.

In addition, in the above-mentioned description, in a case where a Rivest-Shamir-Adleman (RSA) is used, the hash generating unit 242 and the digital signature calculating unit 243 are provided separately as described above. However, in a case where an algorithm such as an RSA SSA-PKCS-V1_5 is used, the hash generating unit 242 and the digital signature calculating unit 243 are integrally formed.

Further, in the above-mentioned description, the case where the hash generating unit 242 and the digital signature calculating unit 243 are provided is described, but the calculation may be performed by the digital signature calculating unit 243 without obtaining the hash value by the hash generating unit 242. In this case, the management information (the operation logs) is compared without comparing the hash values.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a host interface configured to be connectable to a host;
   a nonvolatile memory; and
   a memory controller configured to write data to the nonvolatile memory and read data from the nonvolatile memory based on a command issued from the host through the host interface, wherein
   the memory controller is configured to
      generate command information for the command received from host through the host interface, the command information including command identifying information which identifies the command, the command instructing any one of initialization, erase, reuse, and discard of the memory system,
      generate a digital signature based on the command information using a secret key,
      generate management information which contains the command formation and the digital signature for the command, and
      transmit the management information to the host.

2. The memory system according to claim 1, further comprising
   a memory configured to store operation/management information containing identification information identifying the memory system, time information indicating a time when the command is received, and the secret key, wherein
   the memory controller generates the command information based on the operation/management information stored in the memory.

3. The memory system according to claim 2, wherein
   the nonvolatile memory includes a user data storage area and a management information storage area, the user data storage area storing user data, and
   the memory controller stores the operation/management information and the management information of the memory in the management information storage area of the nonvolatile memory during shutting down operation of the memory system.

4. The memory system according to claim 3, wherein
   the memory controller is configured to read out the operation/management information stored in the management information storage area to the memory during startup operation of the memory system, and in the generating of the management information, the memory controller generates the command information based on the operation/management information of the memory.

5. The memory system according to claim 2, wherein the memory controller is configured to calculate a hash value of the management information generated by the memory controller, and in the generating of the management information, the memory controller generates first command information as the command information for a first command, and after a first digital signature calculated for the first command information is acquired, generates first management information as the management information, the first command information including the first command and a first hash value, the first hash value being generated for a second command received immediately before the first command, the first management information including the first command information and the first digital signature.

6. The memory system according to claim 1, wherein the command identifying information is a sequence number which is sequentially assigned to the command.

7. The memory system according to claim 1, wherein the memory controller is configured to generate a hash value for the command information, and in the generating of the signature, the memory controller calculates the digital signature based on the hash value using the secret key.

8. The memory system according to claim 1, wherein, in the transmitting of the management information to the host, the memory controller transmits a response to the host, the response being to the command and including the management information.

9. The memory system according to claim 1, wherein, in the transmitting of the management information to the host, the memory controller transmits a response to the host, the response being to a command for acquisition of the management information that is received from the host and including the management information.

10. A method of generating management information in a memory system which includes a host interface configured to be connectable to a host, a nonvolatile memory, and a memory controller configured to write data to the nonvolatile memory and read data from the nonvolatile memory based on a command issued from the host through the host interface, the method comprising:

generating command identifying information identifying the command when the command is received from the host through the host interface, the command instructing any one of initialization, erase, reuse, and discard of the memory system;

generating command information which contains the command identifying information;

generating a digital signature based on the command information using a secret key;

generating management information which contains the command information and the digital signature for the command; and transmitting the management information to the host.

11. The method of generating management information according to claim 10, wherein in the generating of the command information, the command information is generated using operation/management information which contains identification information which is stored in a memory and used for identifying the memory system, time information which indicates a time when the command is received, and the secret key.

12. The method of generating management information according to claim 11, further comprising storing the operation/management information and the management information of the memory in the nonvolatile memory during shutting down operation of the memory system.

13. The method of generating management information according to claim 12, further comprising reading out the operation/management information stored in the nonvolatile memory to the memory during startup operation of the memory system, wherein in the generating of the command information, the command information is generated based on the operation/management information of the memory.

14. The method of generating management information according to claim 11, further comprising:

calculating a hash value of the management information; and storing the hash value in the memory, wherein in the generating of the command information, first command information is generated as the command information for a first command, the first command information including the first command and a first hash value, the first hash value being generated for a second command received immediately before the first command, and in the generating of the management information, after a first digital signature calculated for the first command information is acquired, first management information is generated as the management information, the first management information including the first command information and the first digital signature.

15. The method of generating management information according to claim 10, wherein the command identifying information is a sequence number which is sequentially assigned to the command.

16. The method of generating management information according to claim 10, further comprising generating a hash value of the command information after the generating of the command information, wherein in the calculating of the digital signature, the digital signature is calculated based on the hash value using the secret key.

17. The method of generating management information according to claim 10, wherein, in the transmitting of the management information to the host, a response to the command is transmitted to the host, the response including the management information.

18. The method of generating management information according to claim 10, wherein, in the transmitting of the management information to the host, a response is transmitted to the host, the response being to a command for acquisition of the management information that is received from the host and including the management information.

* * * * *